US008155429B2

(12) United States Patent
Scholz et al.

(10) Patent No.: US 8,155,429 B2
(45) Date of Patent: Apr. 10, 2012

(54) APPARATUS AND METHOD FOR GENERATING A TWO-DIMENSIONAL REPRESENTATION OF AN OBJECT PORTION ARBITRARILY ARRANGED WITHIN AN OBJECT

(75) Inventors: Oliver Scholz, Moehrendorf (DE); Guenther Kostka, Erlangen (DE); Thomas Wenzel, Balersdorf (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 765 days.

(21) Appl. No.: 12/298,318

(22) PCT Filed: Apr. 24, 2007

(86) PCT No.: PCT/EP2007/003599
§ 371 (c)(1),
(2), (4) Date: Nov. 25, 2008

(87) PCT Pub. No.: WO2007/121989
PCT Pub. Date: Nov. 1, 2007

(65) Prior Publication Data
US 2009/0202133 A1    Aug. 13, 2009

(30) Foreign Application Priority Data
Apr. 25, 2006   (DE) .......................... 10 2006 019 060

(51) Int. Cl.
*G06K 9/00*   (2006.01)
(52) U.S. Cl. ........................ 382/149; 382/141

(58) Field of Classification Search .................. 382/149, 382/141, 152, 107, 128
See application file for complete search history.

(56) References Cited

U.S. PATENT DOCUMENTS

| 5,051,904 | A | | 9/1991 | Griffith | |
|---|---|---|---|---|---|
| 5,625,702 | A | * | 4/1997 | Kamada et al. | 382/107 |
| 5,687,209 | A | | 11/1997 | Adams | |
| 6,205,259 | B1 | * | 3/2001 | Komiya et al. | 382/284 |
| 6,424,735 | B1 | * | 7/2002 | Freifeld | 382/154 |
| 6,487,307 | B1 | * | 11/2002 | Hennessey et al. | 382/149 |
| 6,570,954 | B2 | | 5/2003 | Rasche et al. | |
| 7,194,122 | B2 | | 3/2007 | Faber et al. | |

FOREIGN PATENT DOCUMENTS
DE   695 22 751 T2   7/2002

OTHER PUBLICATIONS

Kampp: "The Backprojection Method Applied to Classical Tomography," XP-002466779; Medical Physics; vol. 13, No. 3; May 1986; pp. 329-333.

(Continued)

*Primary Examiner* — Louis Arana
(74) *Attorney, Agent, or Firm* — Keating & Bennett, LLP (57) ABSTRACT

For generating a two-dimensional representation of an object portion arbitrarily arranged within an object, a first image comprising the object, and subsequently a second image comprising the object are generated by means of an imaging device while the object and the imaging device are moving relative to each other. By means of a signal processor, information about a position and a shape of the object portion of interest within the object and its relative motion is received so as to combine, on the basis of the information received, image portions, within the first and second images, which are associated with the object portion of interest.

32 Claims, 5 Drawing Sheets

OTHER PUBLICATIONS

Liu et al.: "Generalized Tomosynthesis for Focusing on an Arbitrary Surface," X-0000110780; IEEE Transactions on Medical Imaging; vol. 8, No. 2; Jun. 1, 1989; pp. 168-172.

Dobbins et al.: "Digital X-Ray Tomosynthesis: Current State of the Art and Clinical Potential," XP-002277335; Physics in Medicine and Biology; Oct. 7, 2003; pp. 65-106.

Özkan et al: "Adaptive Motion-Compensated Filtering of Noisy Image Sequences," XP-000414654; IEEE Transactions on Circuits and Systems for Video Technology; vol. 3, No. 4; Aug. 1, 1993; pp. 277-290.

Official communication issued in counterpart International Application No. PCT/EP2007/003599, mailed on Feb. 15, 2008.

* cited by examiner

APPARATUS AND METHOD FOR GENERATING A TWO-DIMENSIONAL REPRESENTATION OF AN OBJECT PORTION ARBITRARILY ARRANGED WITHIN AN OBJECT

BACKGROUND OF THE INVENTION

The present invention relates to an apparatus and a method for generating a two-dimensional representation of an objection portion arbitrarily arranged within an object, as is employed, e.g., for processing X-ray image data in industrial quality control of products.

The technical field of application of the invention described here comprises processing of X-ray image data, in particular in industrial quality control of products, which is performed by means of X-radiation. One example of the most important cases of application mentioned here is the detection of so-called pipes or porosities in castings such as aluminum wheels. The particular difficulty lies in the fact that the X-ray image data is fraught with image noise as a matter of the underlying principle, said image noise negatively influencing (automatic) recognition of the casting defects. To reduce the image noise, the image content is therefore typically averaged over several pictures of the same kind. In addition to X-ray image technology, the present invention generally relates to imaging methods such as, e.g., ultrasound methods, radar imaging, etc.

In the production of castings, fabrication defects such as air bubbles, porosities or cracks may occur, which may significantly influence mechanical properties and, thus, reliability. Therefore, reliable testing of such parts is indispensible particularly for safety-critical parts in the field of automobiles or aeronautics. In extreme cases, such defects may cause, e.g., a breakage of spokes in aluminum wheels when stress is applied, or during further processing (machining) may cause optical impairments which eventually give cause for items being discarded, which for economic reasons should occur as early in the value creation chain as possible.

Since such production defects are concealed within the material, in the industrial area, pictures are created, mainly by means of X-ray technology, of the relevant areas of the castings wherein cavities are reflected by variations in brightness due to the reduced absorption of the X-rays as compared to the surroundings. Mostly, the variations in brightness in these image data are then processed automatically, detected by suitable software, and then possibly result in the device under test being discarded.

One problem arising in this context is the inevitable noise occurring in the pictures. The variations in brightness caused by porosities are, particularly for minor porosities, within the range of the variations in brightness caused by the noise, so that a reduction of the image noise significantly simplifies future further processing of the image data. Since the image noise directly depends on the number of impinging X-ray quanta, averaging is generally performed over a number of similar pictures or over a relatively long exposure time so as to thereby reduce the noise. By averaging, those image parts which are constant within the images are accentuated, and at the same time the variable image parts (i.e. the noise) are reduced. In order to achieve this it may be useful to keep the device under test still so as to avoid defects caused by shaking.

Since the castings are typically larger than the X-ray sensor available, testing is performed in different steps, each step comprising two-dimensional imaging of part of the device under test on a detector/sensor. To this end, either the X-ray source/detector or the device under test (or both at the same time) are moved to image the next section under test on the detector. Since it is irrelevant for the X-ray images whether the new perspective has been created by moving the device under test or the picture-taking unit or both, it shall be assumed below that only the device under test is moved.

Since, as has already been mentioned, the device under test is to be still while the sequence of pictures to be averaged is taken, a test system typically performs a sequence of picture-taking/movement cycles. In each of these cycles the device under test is accelerated, and is decelerated as soon as the next test position is reached, so as to then take a further sequence of pictures. The acceleration (and the deceleration) are delimited by the handling system, since, e.g., an aluminum wheel which is decelerated abruptly will simply slip through within a gripping device if the contact pressure is not sufficient. In addition, one may wait until potential mechanical vibrations caused by the deceleration process have subsided, so as to avoid the blurring caused by movements before one may start taking the sequence of pictures.

The duration of taking the sequence of pictures depends on the desired measure of noise reduction, but typically ranges from about 10 to 16 pictures, which leads to a reduction of the noise by a factor of 4. Longer durations would indeed further reduce the noise, but as a rule are not practicable since testing of a part is to be performed within as short a time as possible.

In an aluminum wheel to be tested e.g. in a total of 30 pictures taken, the acceleration/deceleration of the wheel typically accounts for 500 ms per image, and the integration of 16 pictures at 25 complete images per second takes a further $16/25$ s=640 ms. This results in a testing time of about 35 seconds for the entire wheel.

The main disadvantage of conventional technology therefore is the large amount of time needed for repeatedly accelerating and decelerating the device under test.

In addition, with such images taken, conventional technology has been limited, by definition, to the two-dimensional projection of a three-dimensional object, so that no evaluation of the depth information within the single image can occur. In addition, it is possible that in one perspective, material defects are masked by other image parts in the projection, so that it may be useful to project each location of the device under test from several perspectives so as to detect these maskings in at least one of several perspectives.

In addition, tracking of potential material defects in noisy, non-averaged single images, and algorithmic discarding of artifacts by means of various defect properties has been known.

Conventional technology further describes tangential radiography, which is described, e.g., in DE 695 22 751 T2. Also, purely two-dimensional methods referred to as (digital) laminography have been known. In this context, a camera takes pictures of an object from various angles so as to therefrom image a planar face in a focused manner, and to image objects located outside this plane in a blurred manner.

In Jing Liu et al., "Generalized Tomosynthesis for Focusing on an Arbitrary Surface", in IEEE Transactions on Medical Imaging, Vol. 8, No. 2, June 1989, a tomosynthesis method is described with which a reconstruction algorithm composes, starting from different tomograms, composes image points within an image plane, the image points of individual tomograms being superimposed such that those image points within an image section of interest constructively will superimpose, whereas such points which are not located within the image section will superimpose at random. In this context, a general concept is disclosed which also enables composing three-dimensional structures on the basis of the individual tomograms.

EP 1 225 444 A2 discloses an X-ray means for creating laminagrams of an object to be examined by means of tomosynthesis. In this context, an X-ray source is located above an object to be examined, which in turn is located above an X-ray detector. The object to be examined is situated on a table which is displaceably mounted. For this reason, a number of single images may be taken which represent shifted image sections of the object to be examined. For superimposing the individual partial images into one overall image, the displacements of the table, which may be detected by means of potentiometers, for example, are used.

In Thomas D. Kampp, "The backprojection method applied to classical tomography", in Med. Phys. 13 (3), May/June 1986, a projection method is described which enables creating split images on the basis of individual tomograms, a split image corresponding to a plane which comprises six degrees of freedom, i.e. three translational and three rotational ones. The individual tomograms may be generated using classical tomographs, the object to be examined being able to undergo various motions, such as linear, circular or rotational motions.

SUMMARY

According to an embodiment, an apparatus for generating a two-dimensional representation of an object portion arbitrarily arranged within an object may have: an imager adapted to generate a first image including a two-dimensional projection of the object, and to subsequently generate a second image including a further two-dimensional projection of the object, while the object and the imager are moving relative to each other; a signal processor adapted to receive information about a position and a shape of the object portion of interest within the object and its relative motion so as to combine, on the basis of the information received, dots within image portions within the first image and within the second image which are associated with the object portion of interest; and a determiner for determining the relative motion of the object to be examined on the basis of information from the first and second images, the determiner being configured to determine the relative motion of the object to be examined on the basis of distinctive details of the object to be examined or a sample incorporated in the object.

According to an embodiment, a method of generating a two-dimensional representation of an object portion arbitrarily arranged within an object may have the steps of: sensing a first image including a two-dimensional projection of the object, sensing a second image including a further two-dimensional projection of the object, receiving information about a position and a shape of the objection portion of interest within the object; determining a relative motion of the object to be examined on the basis of information from the first and second images about distinctive details of the object to be examined or a sample incorporated in the object; and on the basis of the information received, combining dots of image portions, within the first and second images, which are associated with the object portion of interest.

According to an embodiment, a computer program may have: a program code for performing the method of generating a two-dimensional representation of an object portion arbitrarily arranged within an object, wherein the method may have the steps of: sensing a first image including a two-dimensional projection of the object, sensing a second image including a further two-dimensional projection of the object, receiving information about a position and a shape of the objection portion of interest within the object; determining a relative motion of the object to be examined on the basis of information from the first and second images about distinctive details of the object to be examined or a sample incorporated in the object; and on the basis of the information received, combining dots of image portions, within the first and second images, which are associated with the object portion of interest, when the program runs on a computer.

The present invention provides an apparatus for generating a two-dimensional representation of an object portion arbitrarily arranged within an object, the apparatus comprising an imaging means adapted to generate a first image comprising the object, and to subsequently generate a second image comprising the object, while the object and the imaging means are moving relative to each other. In addition, the apparatus comprises a signal processing means adapted to receive information about a position and a shape of the object portion of interest within the object and its relative motion so as to combine, on the basis of the information received, image portions within the first image and within the second image which are associated with the object portion of interest.

The present invention further provides a method of generating a two-dimensional representation of an object portion arbitrarily arranged within an object, the method comprising: sensing a first image comprising the object; sensing a second image comprising the object; receiving information about a position and a shape of the objection portion of interest within the object and the motion thereof; and on the basis of the information received, combining image portions, within the first and second images, which are associated with the object portion of interest.

The core idea of the present invention consists in that single images which are reduced in noise are now generated from a continuous noisy image sequence, these single images depicting arbitrary sectional faces through the object to be examined, and it being possible to simultaneously generate a plurality of these images of different object portions. This is achieved in that a projection specification which corresponds to the motion of the sectional face of interest is applied to the sequence of the images, so that the dots of interest of the sectional face now come to lie one upon the other, as a result of which a noise reduction is achieved in the single images.

The present invention teaches testing three-dimensional objects in continuous motion without having to stop the object for the individual pictures taken. By means of suitable algorithmics, a sequence of noise-reduced single images is obtained from the continuous stream of noisy image data, which noise-reduced single images may then be tested, for example, by means of the conventional image processing algorithms. In accordance with the invention, any section (projection face) is imaged in a focused manner by the object to be tested, while areas located outside the sectional plane are blurred at the same time (tomography/laminography effect). In addition, a plurality of such projection planes of various object portions may be generated simultaneously. The inventive method differs from the above-described planar computer tomography (PCT), which is based on a reconstruction of a planar plane, in that a curved face which is arbitrarily located within the space is imaged in a noise-reduced manner.

As compared to the approaches known in conventional technology, the present invention achieves a higher test speed and a higher test throughput. While in conventional technology, typically half of the testing time per test position is accounted for by positioning a device under test, the throughput of a testing machine may be virtually doubled in the inventive approach. Thus, not only the purchase cost, but also the maintenance cost is reduced for the user, since both the picture-taking time (e.g. image intensifier) and the X-ray tube and mechanical components are subject to wear and tear which is proportional to the operating time. This is further promoted by the possibility of creating several projection planes along any object portions desired.

Unlike in laminography, as has already been mentioned and wherein the image is calculated from several single pictures taken, wherein in each case two of the camera, the object and the X-ray source are to be moved in a coordinated manner, according to the invention a simple, continuous motion is sufficient.

In contrast to tangential radiography, the method described here is not limited to imaging a rotationally symmetric object which is rotationally moved about its axis of rotation. Instead, the object to be tested, the X-ray source and the detector may be arranged in an arbitrary manner as long as imaging of the object is ensured. The object may be moved in an arbitrary manner as long as this motion of the object is either known (sensors at the manipulator or mathematical model) or may possibly be extracted from the image data, for example on the basis of tracking distinctive object features or an incorporated sample.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
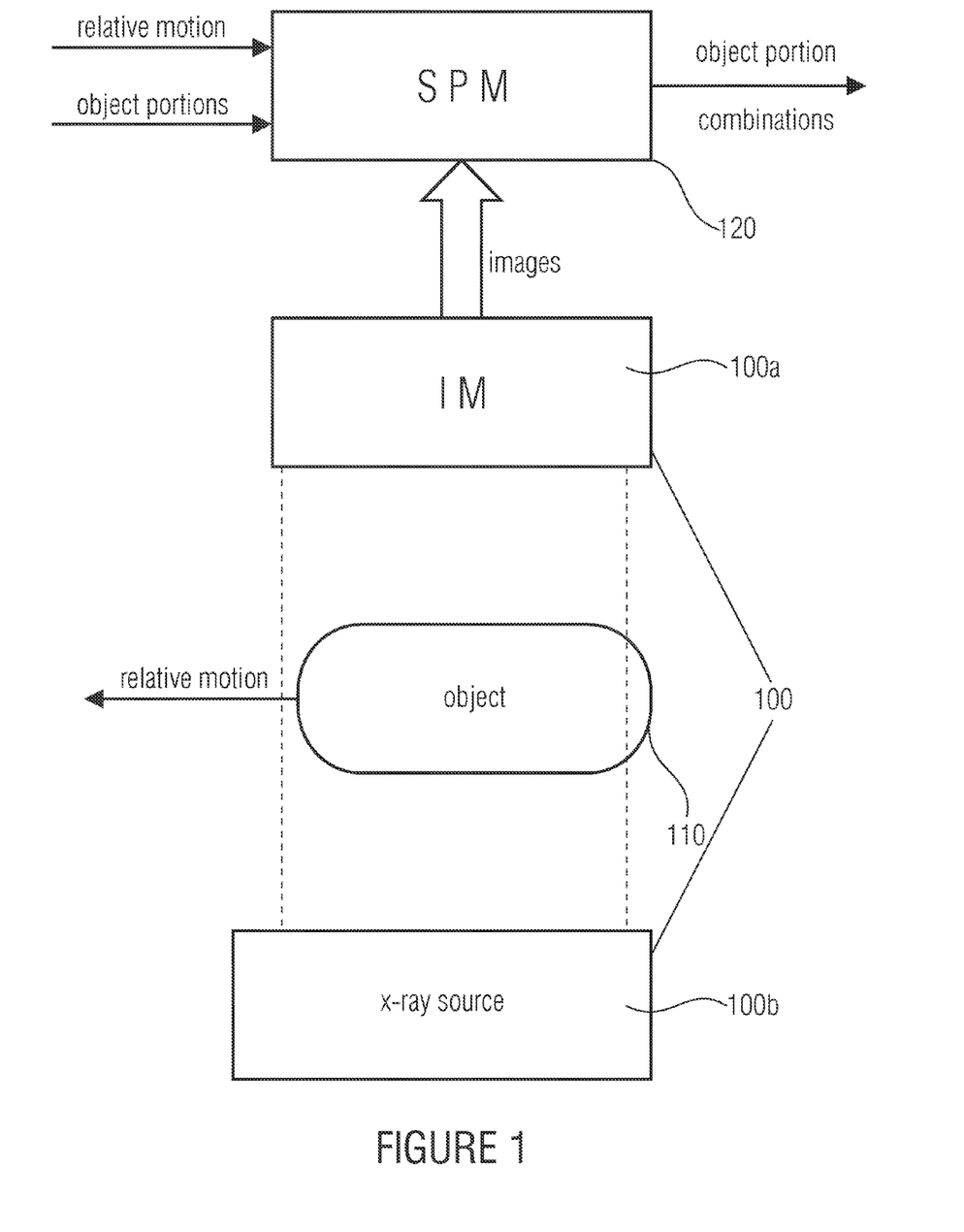
FIG. 1 shows a block diagram of the inventive apparatus in accordance with a advantageous embodiment.

FIG. 1 shows an imaging means (IM) 100a comprising an X-ray source 100b which generates images of an object 110 and forwards them to a signal processing means (SPM) 120. The imaging means 100a, the X-ray source 100b and the object 110 undergo relative motions to one another. The signal processing means 120 receives information about the relative motion between the imaging means 100 and the object 110 as well as information about the object portion(s) to be examined. From this information and the images supplied by the imaging means 100 the signal processing means 120 creates an object-portion combination and outputs same. The signal processing means 120 is configured to receive several different items of object portion information and to simultaneously determine and output several object-portion combinations accordingly.

In one implementation of the advantageous embodiment, the starting point is the principle of taking pictures and averaging X-ray image data for noise reduction. If the object to be tested is moved during picture-taking, it will no longer be possible to form the simple average value $P_{avg}(x,y)$ for each dot with the coordinates (x, y):

$$P_{avg}(x, y) = 1/n \sum_{t=1}^{n} P_t(x, y),$$

with
$P_{avg}(x,y)$: average value
x,y: coordinates
n: number of pictures taken over which averaging is performed
$P_t(x,y)$: image intensity of the single image.

Since in a moving object the pixels are located at different places in each X-ray image, the time dependence of the coordinates may be taken into account. Thus, instead of working with fixed coordinates (x, y) per pixel, coordinates (x(t), y(t)) dependent on the time (or the image number) are now used. Calculation of a pixel in the resulting image thus is as follows:

$$P_{avg}(x, y) = 1/n \sum_{t=1}^{n} P_t(x(t), y(t))$$

The coordinates may be suitably determined. The pixels of an image represent the two-dimensional projection of a three-dimensional object. The coordinates x(t), y(t) in the image $B_t = \{P_t(x,y)\}$ are determined, for the summation of each pixel of the resulting image, such that the projections of the volume dots of the object whose positions within the space change with each picture taken come to lie one above of the other. The volume dots V(x(t),y(t),z(t)) of the object during the motion describe a path within the space, whereupon the projections of these dots also describe a path within the projection plane. Using this path, the pixels are associated with one another in successive projections.

The simple two-dimensional case shall serve to illustrate this: In the event of a purely two-dimensional motion of the object in front of the camera (translational and/or rotational within the camera plane, but not Z direction, i.e. z(t)=constant), a suitable average value may be formed for each pixel which comes up in all of the images having a sequence of the length L. This case is illustrated in FIG. 2 and shall now be explained in detail.

Figure 2A:
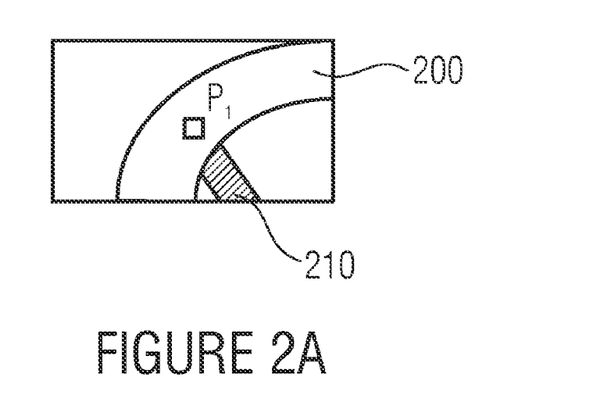
FIG. 2(a) shows a schematic representation of a snapshot of a two-dimensionally moved object at a first point in time.
Figure 2B:
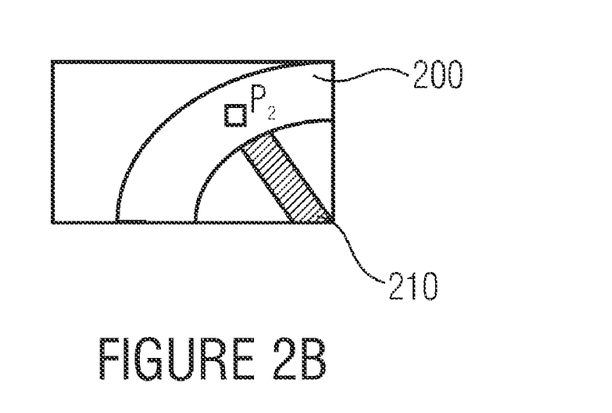
FIG. 2(b) shows a schematic representation of a snapshot of a two-dimensionally moved object at a second point in time.
Figure 2C:
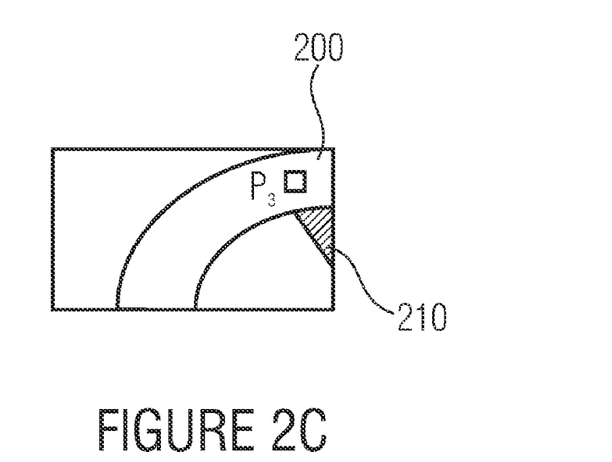
FIG. 2(c) shows a schematic representation of a snapshot of a two-dimensionally moved object at a third point in time.

FIGS. 2(a)-(c) show an image sequence of three X-ray photographs successive in time. In each of the three snapshots, a subportion of a rotating wheel 200 comprising a spoke 210 and a dot p can be seen, the dot p moving in relation to the image section, which is elucidated by the indexes $P_1$, $P_2$ and $P_3$.

Coherent sequence of the length L (here L=3 images) of projection dots may be found for each projected dot of the object (here a wheel) so as to perform the averaging in the manner described. The maximally possible length $L_{max}$ is predefined by the rate of motion of the object and by the picture-taking frequency of the picture-taking unit; it may be suitably selected in dependence on the noise reduction desired.

In order to extract a focused single image of dot p from the image sequence, the individual items of image information about dot p may be superimposed, it being useful to take into account the position of dot p, which undergoes relative changes.

$$P_{avg} = \frac{1}{3}\sum_{i=1}^{3} P_i$$

In the event of a three-dimensional motion of the object in front of the camera, determination of x(t), y(t) is more complex, since the projections of volume elements may vary depending on the depth z(t). Therefore, a projection face F is suitably positioned in relation to the three-dimensional space, bijective imaging being specified for each dot on the projection face F with regard to a pixel of the imaging P(F) on the image sensor. A speed vector corresponding to the speed of the real object is associated with each dot of the projection face F. Thus, the position of a volume dot may be predicted over an image sequence, provided that this dot is located on the face F. If a volume element of the object is moving on this projection face F, it is possible, by means of the speed vector for each dot on the face, to determine and, thus, to sum up the projection P of the dot. Dots located outside the face are more or less blurred and therefore out of focus. FIG. 3 shows this more complicated case.

Figure 3A:
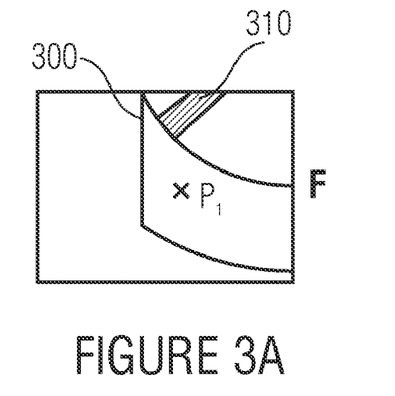
FIG. 3(a) shows a schematic representation of a snapshot of a three-dimensionally moved object at a first point in time.
Figure 3B:
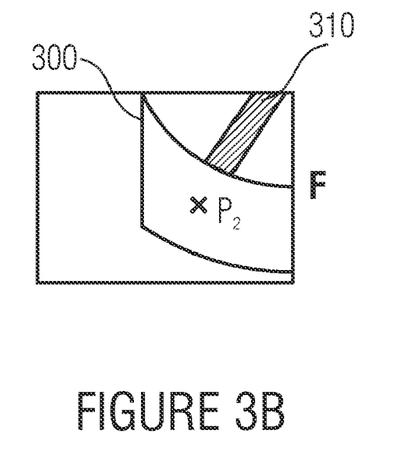
FIG. 3(b) shows a schematic representation of a snapshot of a three-dimensionally moved object at a second point in time.
Figure 3C:
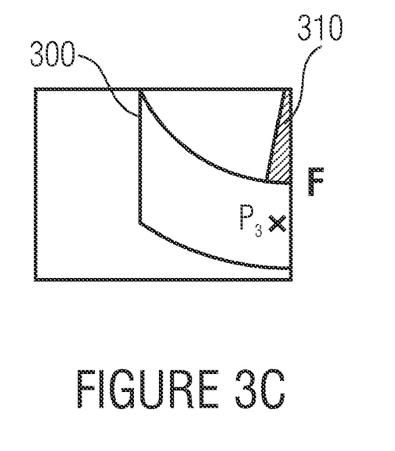
FIG. 3(c) shows a schematic representation of a snapshot of a three-dimensionally moved object at a third point in time.

FIGS. 3 (a)-(c) depict an image sequence of three X-ray photographs successive in time. In each of the three snapshots, a subportion of a rotating wheel 300 is provided with a spoke 310 and a dot p, the dot p moving in relation to the image section, which is elucidated by the indexes $P_1$, $P_2$ and $P_3$. As compared to FIGS. 2(a)-(c), the projection plane F is now tilted, and the dots of the wheel thus also undergo a motion in the z direction z=z(t) in relation to F.

Since the projection plane F is independent of the actual image data, it is also possible to specify several projection faces F(m) so as to image several layers of the wheel 300. For example, these projection faces are selected such that the relative motion vectors of their dots correlate with the motions of the volume dots of the object to be imaged.

Determination of the data relevant to the path determination may either occur directly from the image data (e.g. by determining distinctive object details/features and by tracking these details across image sequences, and by interpolating this path data for pixels located between these features), or it may occur by means of a mathematical description of the projection in dependence on the geometric conditions of the experimental set-up (position of the object manipulator, picture-taking geometry, speeds, etc.).

Figure 4:
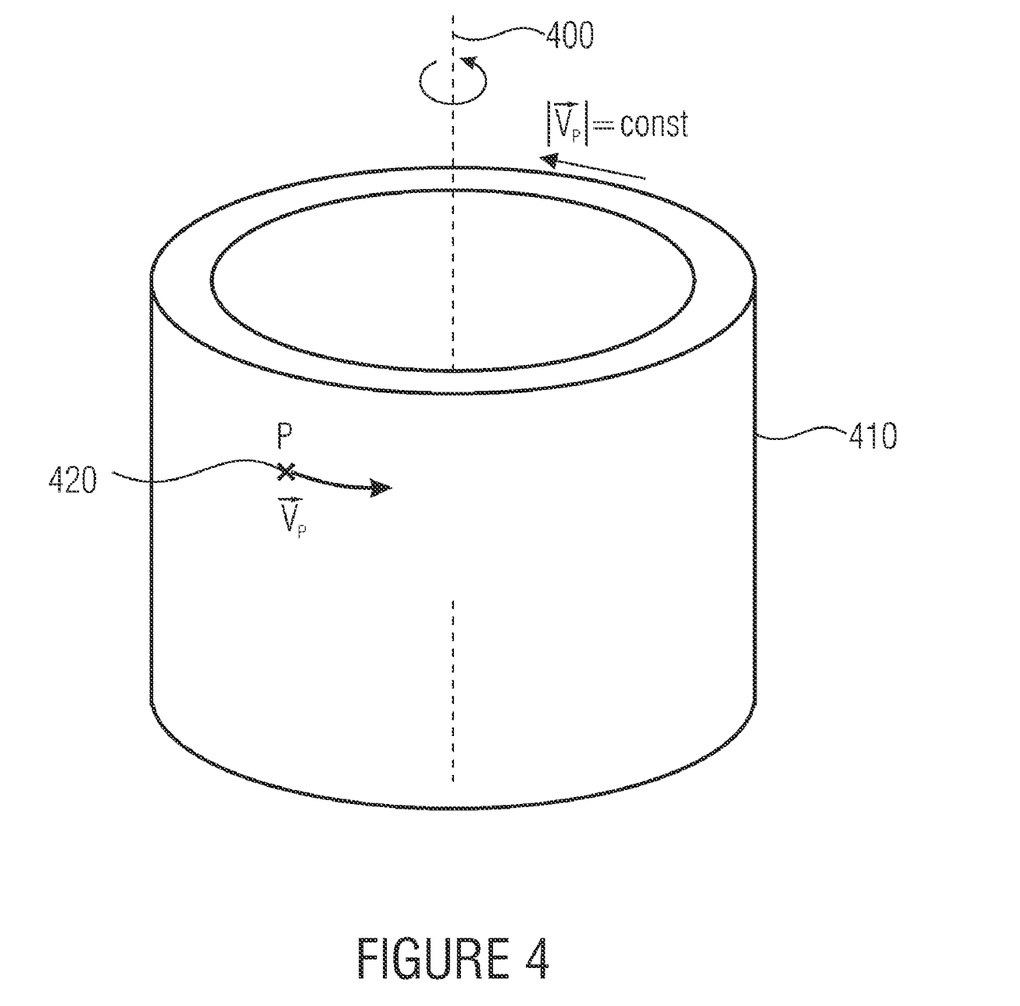
FIG. 4 shows a schematic representation of a cylinder rotating about its axis.

FIG. 4 shows a cylinder 410 rotating about its axis 400 at a constant rotational speed $v_r$. The speed $v_p$ in Cartesian coordinates, however, is not constant on all spatial axes, $$\vec{v}_p \neq const$$

it may be split up into three components v(x), v(y) and v(z), or v(x,y,z).

However, the magnitude of the speed is constant at each location P=(x, y, z) 420 within the space.

$$|\vec{v}_p| = const$$

This means that for a dot within the space within the cylinder at the location P 420 the speed is known irrespective of time. This applies to all dots within the cylinder. Thus a speed v(x,y,z) or the individual components may be calculated at any point in time from the coordinates of a dot within the cylinder, and this may be achieved simply from the knowledge of the position thereof within the space at a given point in time.

If a dot is projected onto a two-dimensional screen, it will move at the speed v(x,y), since the z axis is perpendicular to the projection screen. This means that for each dot of the cylinder, a speed vector in the (x,y) plane may be indicated which depends solely on the coordinates (x, y) on the fluorescent screen.

If a sequence of pictures is taken, the position at which the projection of the dot will be located in the next image may be readily determined by means of this speed vector.

FIGS. 5 (a)-(c) show an image sequence of three temporally successive snapshots at three points in time. Each of the three snapshots shows a rotating cylinder 500 as well as two moving p and q. The dot p is located on that side of the cylinder 500 which faces the viewer (front side), and therefore moves from the left to the right. The dot q is located on that side of the cylinder 500 which faces away from the viewer (rear side), and therefore moves from the right to the left. The indexes at $p_1$, $p_2$ and $p_3$ and at $q_1$, $q_2$ and $q_3$, respectively, illustrate the positions of the dots at the three successive points in time.

Figure 5A:
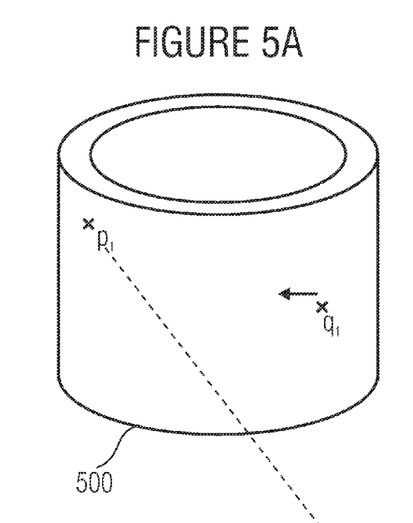
FIG. 5(a) shows a schematic representation of a cylinder rotating about its axis at a first point in time t1.
Figure 5B:
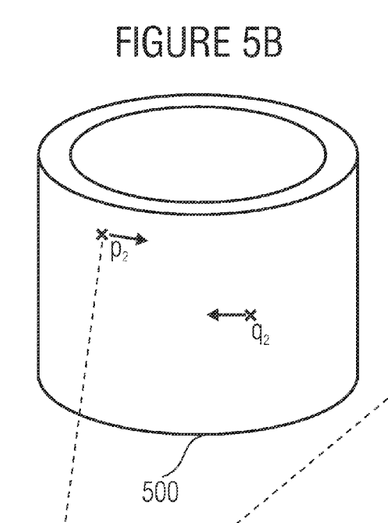
FIG. 5(b) shows a schematic representation of a cylinder rotating about its axis at a second point in time t2.
Figure 5C:
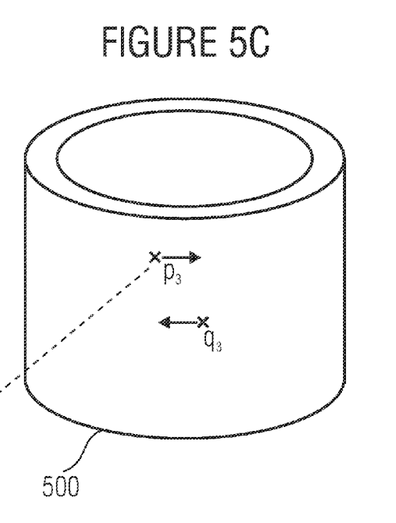
FIG. 5(c) shows a schematic representation of a cylinder rotating about its axis at a third point in time t3.
Figure 5D:
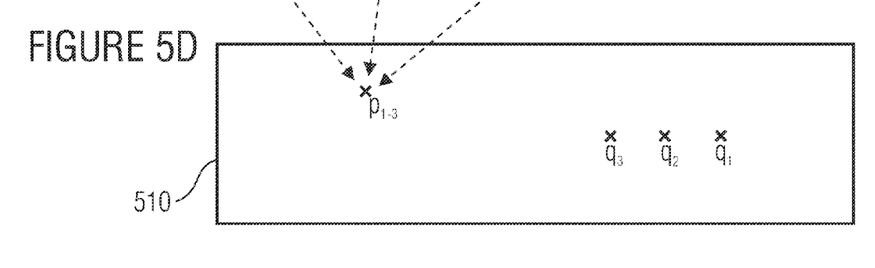
FIG. 5(d) shows a schematic representation of the image plane with the combination of the pixels of FIGS. 5(a)-(c).

Below FIGS. 5 (a)-(c), FIG. 5(d) shows an X-ray image for the projection of the dot p 510. In the X-ray image 510 of the cylinder 500, one can see both dots p and q, the dot p being imaged again and again onto the same pixel in the projection plane, and the dot q also moving within the projection plane. By such a superimposition, one achieves that in the representation, dot p is focused, and dot q is blurred.

It is possible to indicate an object portion (also referred to as area of interest, AOI), e.g. the unwound surface of the front side of the cylinder. According to FIG. 5, for this object portion the speeds of the surface's dots v(x,y) are known, so that one may indicate, for each dot of the object portion, where said dot will be located in the next image of the sequence, and so that the arithmetic average value may be formed from all projections of this dot. This process may be repeated for all dots of the object portion.

Since the dot p is located on the front side and, thus, within the object portion, it will be imaged onto the same location from all projections, and thus the image value (brightness) is averaged over N (in FIG. 5, N=3) pictures taken.

The dot q, however, is taken into account, in the projection, in the brightness of other dots at different positions, since it is located outside the object portion. Thus, it indeed distorts the overall brightness of other dots within the projection plane, but as the number of pictures taken increases, the importance of proportion of dot q decreases. The same applies to the noise component in the image. The importance of the volume portion (constant in time) within the image also decreases when averaging is performed over N images (factor $\sqrt{N}$, i.e. half noise after four pictures taken, etc.).

What results is an image wherein details within the object portion are focused and high in contrast, and details outside the object portion and the image noise are out of focus, or blurred.

In the advantageous embodiment, the cylinder is the rim of an aluminum wheel. The blurred image components may readily be separated from focused image components by means of image processing, and the latter may then possibly be classified as fabrication defects. An image intensifier having a video camera connected downstream from it which generates image sequences of about 25 to 30 images per second may serve as a picture-taking unit, for example.

The present invention is not limited to rotational motions. If the predictability of the projected positions from one image of the sequence to the next is given, object portions may be projected as desired. Thus, each projected dot of an object portion follows a trajectory, and knowing all of the tracks of all the dots of the object portion, the present invention will image only such dots in a focused manner whose projections move precisely on the pre-calculated tracks.

The present invention is not limited to constant speeds, but is also suitable for non-constant speeds, a separate characteristic diagram may then be determined from speed vectors at any point in time of a snapshot.

The speed vectors v(x,y) may be determined either from a test piece which has been prepared (e.g. test piece comprising a bore), or it may be determined purely mathematically from knowing the picture-taking geometry.

In addition to X-ray technology, the present invention generally relates to imaging methods such as ultrasound methods, radar imaging, etc.

In addition, the inventive apparatus enables storage or input of several object portions to be examined, which may then be determined simultaneously by the apparatus described. One implementation of the present invention, for example, could generate, in production of components, several sectional images, could represent same simultaneously and thus enable faster, more efficient and more comprehensive testing.

Further embodiments shall be contemplated below with reference to FIG. 1 which enable determination of the relative motion of the object 110 to be examined. Practical examinations have shown that the motion of the object under test may be problematic even if said motion is uniform. For this reason, embodiments may comprise means for determining the relative motion of the object 110 to be examined on the basis of the information derived from the first and second images. The relative motion of the object 110 to be examined may be determined, for example, on the basis of distinctive details of the object 110 to be examined. For example, the distinctive details may be corners, edges, bright or dark patches, openings or bores or other geometric details of the images of the object, which may be identified by means of image processing.

For example, any burrs and uneven spots that may have been caused by a casting process may cause, in combination with a handling device, the device under test to suddenly shift away from its predetermined position, and may thus cause the respective projection to do the same. In this context, by the projection suddenly shifting away from its predetermined position is meant that, for example, the center of the object under test is not always located at the center of an image, but only within an area having a certain extension, for example around the center. In embodiments, this area may comprise 30 pixels, for example, and would render a conventional test procedure unworkable in practice without any further steps.

In embodiments, modeling of the object motion may be used as an approximate prediction of the actual object motion. For example, arbitrary object details such as corners or edges or particularly bright or dark details may be detected in a current image, and may be found again in a subsequent image by means of an approximate prediction. From a shift of the predicted coordinates to the actual coordinates, the prediction of all image pixels based on the few image pixels of a distinctive detail may be corrected.

In embodiments, the means for determining the relative motion of the object 110 to be examined may therefore be further configured to take into account, from a position of a distinctive detail within the first image, an estimation of a position of the image detail within the second image. The means for determining may further be configured to model the relative motion of the object to be examined.

This approach may be particularly advantageous if pre-assumptions may be made about the properties of the offset of the object 110 to be examined. In one embodiment, wherein aluminum wheels are to be tested, these are gripped at the rim, so that casting burrs at the rim are reflected, for example, in a shift within the rotational plane. Such a symmetric shift may be expressed in an equation system with which the coordinates may be globally corrected, provided that a sufficient number of pairs of coordinates are found which may be used for solving the equation system.

In one embodiment, the shift of an aluminum wheel which is imaged perpendicularly to the rotational axis, for example directed to the hub, may be contemplated. Due to a burr at the rim, the aluminum wheel may be present, in a current picture, such that it is shifted downward toward the 6 o'clock position by, e.g., 20 pixels. However, it may be known from the picture-taking geometry that burrs cause shifts in the x or y directions only, but cannot lead to any tilting, twisting, etc. In this embodiment it is then sufficient, for example, to calculate one detail of the object's center of gravity, which in this case may be the center of the rim or the hub. Said center of gravity of the object may then be shifted in the y direction, i.e. downward, by the 20 pixels which have already been mentioned above. Thus, all of the predictions of the pixel coordinates may be corrected accordingly, and the integration process may be applied.

Depending on the conditions, the inventive method may be implemented in hardware or in software. The implementation may occur on a digital storage medium, in particular a disc or CD comprising electronically readable control signals which may cooperate with a programmable computer system such that the respective method is performed. Generally, the invention thus also consists in a computer program product comprising a program code, which is stored on a machine-readable carrier, for performing the inventive method, when the computer program product runs on a computer. In other words, the invention may thus be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus comprising:

an imager adapted to generate a first image comprising a two-dimensional projection of an object, and to subsequently generate a second image comprising a further two-dimensional projection of the object, while the object and the imager are moving relative to each other;

a signal processor adapted to generate a two-dimensional representation of an object portion arbitrarily arranged within the object, and to receive information about a position and a shape of the object portion within the object and its relative motion so as to combine, on the basis of the information received, dots within image portions within the first image and within the second image which are associated with the object portion; and a determiner adapted to determine the relative motion of the object on the basis of information from the first and second images, the determiner being configured to determine the relative motion of the object on the basis of distinctive details of the object or a sample incorporated in the object.

2. The apparatus as claimed in claim 1, adapted to generate a plurality of two-dimensional representations of object portions arbitrarily arranged within the object, the signal processor being adapted to detect, for each of the object portions represented, information about shapes and positions of the object portions within the object.

3. The apparatus as claimed in claim 1, wherein the signal processor is adapted to generate a two-dimensional projection of the object portion from the first and second images.

4. The apparatus as claimed in claim 1, wherein the signal processor is adapted to superimpose the image portions from the first and second images.

5. The apparatus as claimed in claim 1, wherein the information about the position and the shape of the object portion to be represented comprises volume dots within the object, the signal processor being adapted to calculate, on the basis of the relative motion of the object, a position of the volume dot, associated with the object portion, within the first and second images.

6. The apparatus as claimed in claim 1, wherein the determiner is configured to determine the relative motion of the object rotating about an axis.

7. The apparatus as claimed in claim 6, wherein the object is a device under test displaced from a rotational plane or from a picture-taking geometry because of casting burrs.

8. The apparatus as claimed in claim 6, wherein the determiner adapted to determine the relative motion of the object is further configured to take into account, from a position of a distinctive detail within the first image, an estimation of a position of the distinctive detail within the second image.

9. The apparatus as claimed in claim 8, wherein the determiner is further configured to model the relative motion of the object.

10. The apparatus as claimed in claim 7, wherein the distinctive details comprise corners, edges, bright or dark patches, openings or bores of the object.

11. The apparatus as claimed in claim 1, wherein the relative motion is a linear motion.

12. The apparatus as claimed in claim 1, wherein the relative motion is a rotational motion.

13. The apparatus as claimed in claim 12, wherein the object portion comprises any shape and position within the object, except for a subarea which is arranged in a radially symmetric manner in relation to an axis of rotation of the rotational motion.

14. The apparatus as claimed in claim 1, configured to project a three-dimensional object onto a two-dimensional detector.

15. The apparatus as claimed in claim 1, configured to calculate positions of projected pixels of a surface area within the object in accordance with positions of a subset of volume dots of the object.

16. The apparatus as claimed in claim 1, configured to calculate a surface area within the object using image details within at least one of the first and second images.

17. The apparatus as claimed in claim 1, configured to average over related projections of a volume dot of the object.

18. The apparatus as claimed in claim 1, configured to calculate several surface areas of various shapes and positions from a plurality of generated images.

19. A method comprising:
sensing a first image comprising a two-dimensional projection of an object,
sensing a second image comprising a further two-dimensional projection of the object,
receiving information about a position and a shape of an object portion arbitrarily arranged within the object;
determining a relative motion of the object on the basis of information from the first and second images about distinctive details of the object or a sample incorporated in the object; and
on the basis of the information received, generating a two-dimensional representation of the object portion arbitrarily arranged within the object by combining dots of image portions, within the first and second images, which are associated with the object portion.

20. The method as claimed in claim 19 comprising:
receiving information about the shape and the position within the object for each of a plurality of the object portions.

21. The method as claimed in claim 19, comprising:
two-dimensionally projecting the object portion from the first and second images.

22. The method as claimed in claim 19, comprising:
superimposing the image portions from the first and second images.

23. The method as claimed in claim 19, comprising:
sensing volume-dot information about the position and the shape of the object; and
calculating a position of volume dots on the basis of the relative motion of the object within the first and second images.

24. The method as claimed in claim 19, comprising:
determining the relative motion of the object rotating about an axis.

25. The method as claimed in claim 24, wherein the object is a device under test displaced from a rotational plane or from a picture-taking geometry because of casting burrs.

26. The method as claimed in claim 25, wherein the step of determining further comprises estimating a position of a distinctive detail within the second image on the basis of a position of the distinctive detail within the first image.

27. The method as claimed in claim 26, wherein the step of determining further comprises modeling the relative motion of the object.

28. The method as claimed in claim 26, wherein the distinctive details comprise corners, edges, bright or dark patches, openings or bores of the object.

29. The method as claimed in claim 19, wherein the object undergoes linear motion.

30. The method as claimed in claim 19, wherein the object undergoes rotational motion.

31. The method as claimed in claim 30, wherein the object portion comprises any shape and position, except for a subarea which is arranged in a radially symmetric manner in relation to an axis of rotation of the rotation motion.

32. A non-transitory computer readable medium storing a computer program comprising a program code for performing, when the computer program is executed on a computer, a method comprising:
sensing a first image comprising a two-dimensional projection of an object,
sensing a second image comprising a further two-dimensional projection of the object,
receiving information about a position and a shape of an object portion arbitrarily arranged within the object;

determining a relative motion of the object on the basis of information from the first and second images about distinctive details of the object or a sample incorporated in the object; and on the basis of the information received, generating a two-dimensional representation of the object portion arbitrarily arranged within the object by combining dots of image portions, within the first and second images, which are associated with the object portion.

* * * * *